(12) United States Patent
Nishimori et al.

(10) Patent No.: US 8,541,061 B2
(45) Date of Patent: Sep. 24, 2013

(54) ANTICORROSION COATING METHOD FOR ZINC-PLATED STEEL STRUCTURE

(75) Inventors: Shuji Nishimori, Takamatsu (JP); Yoshimitsu Adachi, Amagasaki (JP); Makoto Kasuya, Amagasaki (JP)

(73) Assignees: Shikoku Research Institute Incorporated, Takamatsu-shi (JP); Kansai Paint Co., Ltd., Amagasaki-shi (JP)

( * ) Notice: Subject to any disclaimer, the term of this patent is extended or adjusted under 35 U.S.C. 154(b) by 828 days.

(21) Appl. No.: 11/991,011

(22) PCT Filed: Aug. 25, 2006

(86) PCT No.: PCT/JP2006/316700
§ 371 (c)(1),
(2), (4) Date: Feb. 26, 2008

(87) PCT Pub. No.: WO2007/023934
PCT Pub. Date: Mar. 1, 2007

(65) Prior Publication Data
US 2009/0148610 A1    Jun. 11, 2009

(30) Foreign Application Priority Data
Aug. 26, 2005    (JP) .................................. 2005-246130

(51) Int. Cl.
*B05D 1/36*    (2006.01)
*B05D 7/00*    (2006.01)

(52) U.S. Cl.
USPC ........................................ 427/407.1; 427/402

(58) Field of Classification Search
USPC ...................... 427/386, 402, 407.1
See application file for complete search history.

(56) References Cited

U.S. PATENT DOCUMENTS

| | | | | |
|---|---|---|---|---|
| 4,745,032 A | * | 5/1988 | Morrison | 428/215 |
| 4,913,746 A | * | 4/1990 | Marder et al. | 148/503 |
| 5,837,785 A | * | 11/1998 | Kinsho et al. | 525/527 |
| 6,045,873 A | * | 4/2000 | Adachi et al. | 427/410 |
| 2003/0078313 A1 | * | 4/2003 | Santobianco et al. | 522/28 |

FOREIGN PATENT DOCUMENTS

| | | |
|---|---|---|
| JP | 04-022624 | 1/1992 |
| JP | 5-200357 | 8/1993 |
| JP | 06-031245 | 2/1994 |
| JP | 7-008905 | 1/1995 |
| JP | 8-217859 | 8/1996 |
| JP | 9-057192 | 3/1997 |
| JP | 10-216621 | 8/1998 |
| JP | 2000-140746 | 5/2000 |
| JP | 2001-198521 | 7/2001 |

OTHER PUBLICATIONS

R.S. Bauer, E.J. Marx, M.J. Watkins; Ch. 10: Epoxy Resins in Coatings, J.V. Koleske, Editor, Paint and Coating Testing Manual, 14th Ed. of the Garner-Sward Handbook, ASTM, 1995.*
R.S. Bauer, E.J. Marx, M.J. Watkins; Ch.10: Epoxy Resins in Coatings, J.V. Koleske, Editor, Paint and Coating Testing Manual, 14th Ed. of the Gamer-Sward Handbook, ASTM, 1995.*
Masao Kodama, et al.; "Toryo to Toso (enlarged edition)", enlarged parts 1-2, Jul. 30, 2000, pp. 152-153, 196-197, 279, 404.
Matsutoyo Ishizuka et al.; Toso Hand Book, $1^{st}$ print, Nov. 20, 1996, pp. 32, 306, 308, table 4.1.2.
International Search Report for PCT/JP2006/316700 mailed Nov. 28, 2006.
International Preliminary Report on Patentability (Chapter II of the Patent Cooperation Treaty), Dec. 27, 2007.

* cited by examiner

*Primary Examiner* — Katherine A Bareford
*Assistant Examiner* — James M Mellott
(74) *Attorney, Agent, or Firm* — Kratz, Quintos & Hanson, LLP

(57) ABSTRACT

The present invention provides an anticorrosion coating method for a galvanized steel structure, the method comprising applying an undercoating composition (I) to a cured thickness of 10 to 200 μm to a surface of a galvanized steel structure, and then applying thereto an overcoating composition (II) to a cured thickness of 100 to 1,500 μm; the undercoating composition (I) comprising an epoxy resin (A) having two or more epoxy groups per molecule, a specific amount of a resin (B) such as a urethane-modified epoxy resin, and an amine-based curing agent (C); the undercoating composition (I) having a shrinkage stress of 20 $kg/cm^2$ or less when it is in the form of a 50 μm-thick cured coating film; and the overcoating composition (II) comprising an epoxy resin (D) having two or more epoxy groups per molecule, a specific amount of a flaky pigment (E), and an amine-based curing agent (F).

6 Claims, No Drawings

ANTICORROSION COATING METHOD FOR ZINC-PLATED STEEL STRUCTURE

TECHNICAL FIELD

The present invention relates to an anticorrosion coating method for galvanized steel structures.

BACKGROUND ART

Steel structures, such as power-transmission steel towers, are placed in environments in which they are exposed to the weather and susceptible to rust, and therefore anticorrosion treatment, such as galvanization, is carried out on the surfaces of the steel materials of such structures.

The surface of a steel base material that has been subjected to galvanization, such as hot dip galvanization, has a plating film usually comprising a δ1 layer and ζ layer both made of an iron-zinc alloy and formed in this order from the steel base material, and an η layer made of zinc and formed on the ζ layer. Galvanized steel structures have been said to be maintenance-free, and used without coating, or used with color coatings when they need to be distinguishable for the purpose of obstruction marking or the like, or when they need to be compatible with the surrounding environment.

The reality is, however, that the η layer of zinc is depleted more quickly than expected due to the effects of acid rain and the like in recent years, and there are many steel structures, such as power-transmission steel towers, in which the η layer has been eliminated to expose the ζ layer of an iron-zinc alloy, or the η layer and ζ layer have been eliminated to expose the δ1 layer, which is an iron-zinc alloy layer in contact with the steel base material. Red rust is gradually formed on steel structures in which the ζ layer or δ1 layer is exposed. Since red rust not only deteriorates the appearance but also becomes a factor in the reduction of the strength of such steel structures, it is necessary to provide anticorrosion coatings.

Japanese Unexamined Patent Publication No. 2000-140746 proposed a method for providing an anticorrosion coating on such a rusted steel structure, in which the surface of the steel structure is hand-cleaned and then coated with an undercoating, overcoating, etc.

The hand-cleaning is carried out according to the conditions of the steel structure as a substrate, and is usually performed using a power tool, such as a disc sander or the like, in combination with a hand tool, such as a scraper, hammer, or the like, to remove deteriorated coating films if any, and grind off the rusted portions until the metal surface is exposed. Insufficiency in such treatment of the substrate may become a factor in the reduction of the adhesion and anticorrosion performance of the anticorrosion coating film to be formed thereafter by applying an undercoating and overcoating, and may shorten the life of the anticorrosion coating film. However, when such an anticorrosion coating method is carried out on a power-transmission steel tower or the like, the method is performed in a high place without a scaffold and the manual cleaning process requires a considerably long time, causing the problems of prolonged power outage and great safety and physical burdens on the workers. Recently, therefore, an anticorrosion coating is provided when the ζ or δ1 layer made of an alloy has been exposed but red rust has not been formed, but conventional undercoating compositions sometimes do not have sufficient adhesion to such exposed surfaces of alloy layers. Further, the cycle of recoating when using such a conventional coating method is ten and several years at the most. Under such a situation, it is difficult to sufficiently maintain and control the corrosion prevention of steel structures, such as power-transmission steel towers, which exist in considerable numbers.

To cope with these problems, Japanese Unexamined Patent Publication No. 2001-198521 proposed a coating method in which a one-component epoxy resin coating composition comprising an epoxy resin, a flaky pigment, a ketimine compound, etc., is used as an undercoating composition. This coating method is capable of forming a coating film with excellent adhesion and anticorrosion properties on the surface of a galvanized steel structure. However, at a portion where the η layer of zinc in the galvanization film has been depleted to expose the ζ or δ1 layer of an alloy, the coating film has insufficient adhesion and is unlikely to ensure long-term corrosion prevention, i.e., a recoating cycle of 50 years or more.

DISCLOSURE OF THE INVENTION

Problems to be Solved by the Invention

An object of the present invention is to provide an anticorrosion coating method for a galvanized steel structure, such as a power-transmission steel tower, the method being capable of forming a multilayer coating film that has excellent adhesion to a steel structure as a substrate and realizes long-term corrosion prevention, even if the η layer, i.e., a zinc layer, of the substrate is depleted and the ζ layer and δ1 layer, i.e., alloy layers, are exposed.

Means for Solving the Problems

The present inventors conducted extensive research and found that the above object can be achieved by applying a specific undercoating composition and overcoating composition, each to a specific thickness, to a surface of a galvanized steel structure. The present invention has been thus achieved.

The present invention provides the following anticorrosion coating methods.

1. An anticorrosion coating method for a galvanized steel structure, the method comprising applying an undercoating composition (I) to a cured thickness of 10 to 200 μm to a surface of a galvanized steel structure, and then applying thereto an overcoating composition (II) to a cured thickness of 100 to 1,500 μm;

the undercoating composition (I) comprising an epoxy resin (A) having two or more epoxy groups per molecule; at least one resin (B) selected from the group consisting of urethane-modified epoxy resins, xylene resins, toluene resins, ketone resins, coumarone resins, and petroleum resins; and an amine-based curing agent (C); the amount of the resin (B) being 10 to 300 parts by weight per 100 parts by weight of solids of the resin (A); the undercoating composition (I) having a shrinkage stress of 20 kg/cm² or less when it is in the form of a 50 μm-thick coating film cured at 23° C. for 30 days after application;

the overcoating composition (II) comprising an epoxy resin (D) having two or more epoxy groups per molecule, a flaky pigment (E), and an amine-based curing agent (F); and the amount of the flaky pigment (E) being 5 to 100 parts by weight per 100 parts by weight of solids of the resin (D).

2. An anticorrosion coating method according to Item 1, wherein the resin (B) in the undercoating composition (I) is a urethane-modified epoxy resin.

3. An anticorrosion coating method according to Item 1, wherein the resin (B) in the undercoating composition (I) is a xylene resin, a toluene resin, a ketone resin, a coumarone resin, or a petroleum resin; the resin (B) being solid at room temperature and having a melting point of 60° C. or higher.

4. An anticorrosion coating method according to Item 1, wherein the proportion of the amine-based curing agent (C) in the undercoating composition (I) is such that the active hydrogen equivalent of the amine-based curing agent (C) is 0.5 to 3.0 per equivalent of epoxy group in the epoxy resin (A).

5. An anticorrosion coating method according to Item 1, wherein the proportion of the amine-based curing agent (F) in the overcoating composition (II) is such that the active hydrogen equivalent of the amine-based curing agent (F) is 0.5 to 3.0 per equivalent of epoxy group in the epoxy resin (D).

6. An anticorrosion coating method according to Item 1, wherein the surface of the galvanized steel structure is an exposed surface of a ζ layer made of an iron-zinc alloy and/or an exposed surface of a δ1 layer made of an iron-zinc alloy.

Undercoating Composition (I)

The undercoating composition (I) used in the method of the present invention comprises an epoxy resin (A) having two or more epoxy groups per molecule; at least one resin (B) selected from the group consisting of urethane-modified epoxy resins, xylene resins, toluene resins, ketone resins, coumarone resins, and petroleum resins; and an amine-based curing agent (C).

The epoxy resin (A) is an epoxy resin having two or more, and preferably two to five, epoxy groups per molecule. The epoxy resin (A) preferably has a number average molecular weight of about 350 to about 3,000, and more preferably about 400 to about 1,500. The epoxy resin (A) preferably has an epoxy equivalent weight of about 80 to about 1,000, and more preferably about 150 to about 700.

Examples of the epoxy resin (A) include epoxy resins obtained by reacting polyhydric alcohols, polyhydric phenols, or the like, with an excess of epichlorohydrin or alkylene oxide. Examples of polyhydric alcohols include ethylene glycol, polyethylene glycol, propylene glycol, neopentyl glycol, butylene glycol, hexane diol, glycerol, trimethylol ethane, trimethylol propane, pentaerythritol, diglycerol, sorbitol, etc. Examples of polyhydric phenols include 2,2-bis(4-hydroxyphenyl)propane[bisphenol A], halogenated bisphenol A, 4,4-dihydroxyphenylmethane[bisphenol F], tris(4-hydroxyphenyl)propane, resorcin, tetrahydroxyphenylethane, novolac-type polyhydric phenols, cresol-type polyhydric phenols, etc.

Other examples of epoxy resins include 1,2,3-tris(2,3-epoxypropoxy)propane, phthalic acid diglycidyl ester, hexahydrophthalic acid glycidyl ester, tetrahydrophthalic acid glycidyl ester, dimer acid glycidyl ester, tetraglycidyl aminodiphenylmethane, 3,4-epoxy-6-methylcyclohexylmethyl carboxylate, triglycidyl isocyanurate, 3,4-epoxycyclohexylmethyl carboxylate, polypropylene glycol glycidyl ether, etc.

The resin (B) is a resin selected from the group consisting of urethane-modified epoxy resins, xylene resins, toluene resins, ketone resins, coumarone resins, and petroleum resins. It is particularly preferable to use a urethane-modified epoxy resin as the resin (B), from the viewpoint of the control of shrinkage stress of the coating film formed, and the adhesion of the coating film to alloy layers in the galvanization film.

Examples of urethane-modified epoxy resins include those obtained by reacting polyisocyanate compounds or monoisocyanate compounds with amine-added epoxy resins prepared by reacting epoxy resins with amines.

Epoxy resins that can be used as the epoxy resin (A) can be used as the above-mentioned epoxy resins. Usable amines include alkanolamines, aliphatic amines, aromatic amines, alicyclic amines, etc. Usable polyisocyanate compounds include known aliphatic, aromatic, or alicyclic polyisocyanate compounds. Usable monoisocyanate compounds include those obtained by reacting aliphatic or aromatic monoamines with phosgene; those obtained by reacting one of the isocyanate groups of diisocyanate compounds with a hydroxy-containing compound; etc.

The urethane-modified epoxy resin preferably has a number average molecular weight of about 1,000 to about 65,000, and more preferably about 2,000 to about 25,000. When the number average molecular weight is less than 1,000, low adhesion and/or low water resistance may result, whereas when the number average molecular weight is more than 65,000, the coating composition has high viscosity and may adversely affect the workability and/or storage stability, and thus such number average molecular weights are not preferable.

Resins selected from xylene resins, toluene resins, ketone resins, coumarone resins, and petroleum resins are solid at room temperature, and preferably have a melting point of 60° C. or higher, and more preferably about 70 to about 140° C.

Urethane-modified epoxy resins, xylene resins, toluene resins, ketone resins, coumarone resins, and petroleum resins can be used singly or in combination as the resin (B).

The amount of the resin (B) is about 10 to about 300 parts by weight, preferably about 30 to about 200 parts by weight, and more preferably about 50 to about 150 parts by weight, per 100 parts by weight of solids of the resin (A). When the amount is less than about 10 parts by weight, the adhesion to substrate surfaces, and in particular to exposed alloy layer surfaces, is low, whereas when the amount is more than about 300 parts by weight, poor anticorrosion properties result, and thus such amounts are not preferable.

In particular, when a urethane-modified epoxy resin is used as the resin (B), it is suitable that the amount of the urethane-modified epoxy resin be within the range of about 10 to about 300 parts by weight, preferably about 50 to about 200 parts by weight, and more preferably about 95 to about 150 parts by weight, per 100 parts by weight of solids of the resin (A), from the viewpoint of the adhesion to substrate surfaces, and in particular to exposed alloy layer surfaces, and anticorrosion properties. When a resin selected from xylene resins, toluene resins, ketone resins, coumarone resins, and petroleum resins, is used as the resin (B), it is suitable that the amount of the resin be within the range of about 10 to about 200 parts by weight, and preferably about 50 to about 200 parts by weight, per 100 parts by weight of solids of the resin (A), from the viewpoint of the adhesion to substrate surfaces, and in particular to exposed alloy layer surfaces, and anticorrosion properties.

The amine-based curing agent (C) is a curing agent for the epoxy resin (A), and known amine-based curing agents can used without limitation. Examples of amine-based curing agents include polyamine compounds and the like.

The polyamine compounds may be aliphatic, alicyclic, or aromatic. The polyamine compounds need to have a primary amino group and/or a secondary amino group that undergoes a curing reaction with an epoxy resin, and it is advantageous that the polyamine compounds have an active hydrogen equivalent of generally about 2,000 or less, and preferably about 30 to about 1,000. It is suitable that the polyamine compounds have a number average molecular weight of about 5,000 or less, and preferably about 80 to about 3,000.

Examples of such polyamine compounds include ethylenediamine, propylenediamine, butylenediamine, hexamethylenediamine, diethylenetriamine, triethylenetetramine, pentaethylenehexamine, and like aliphatic polyamines; metaxylenediamine, diaminodiphenylmethane, phenylenediamine, and like aromatic polyamines; isophoronediamine, cyclohexylpropylamine, norbornenediamine, and like alicyclic polyamines; epoxy adducts of these polyamines, and like modified polyamines; polyamides having at least one primary amino group at their molecular terminals.

It is desirable that the amine-based curing agent (C) be used in a proportion such that the active hydrogen equivalent of the amine-based curing agent (C) is about 0.5 to about 3.0, and preferably about 0.8 to about 1.5, per equivalent of epoxy group in the epoxy resin (A), from the viewpoint of the curability and anticorrosion properties of the coating film.

If necessary, the undercoating composition (I) may contain a silane coupling agent in order to improve the adhesion and pigment dispersibility. The undercoating composition (I) may further contain, if necessary, various additives such as coloring pigments, extender pigments, rust-preventive pigments, and like pigments; thickeners; plasticizers; fillers; anti-sagging agents; pigment dispersants; etc.

The undercoating composition (I) is usually an organic-solvent-based coating composition, and preferably has a solids content of about 40 wt. % to about 80 wt. %. The organic solvent in the organic-solvent-based coating composition may be the solvent used in the production of the resin component, or an additional organic solvent may be used to adjust the solids content or for other purposes. Known organic solvents are usable, including, for example, toluene, xylene, mineral spirits, and like aromatic hydrocarbon solvents; n-hexane, n-heptane, n-octane, n-decane, n-dodecane, cyclopentane, cyclohexane, and like aliphatic hydrocarbon solvents; acetone, methyl ethyl ketone, methyl isobutyl ketone, diisobutyl ketone, and like ketone solvents; ethyl acetate, n-butyl acetate, isobutyl acetate, and like ester solvents; ethyl alcohol, propyl alcohol, butyl alcohol, and like alcohol solvents; ethylene glycol, diethylene glycol, propylene glycol, hexylene glycol, and like glycol solvents; glycol ether solvents such as methyl ether, ethyl ether, propyl ether, butyl ether, etc. of the above-mentioned glycol solvents; and the like.

The undercoating composition (I) is usually a two-component coating composition of a coating composition base comprising the components other than the amine-based curing agent (C), and a curing agent comprising the amine-based curing agent (C). The coating composition base and the curing agent are mixed together for application. The pot life after mixing is usually about 1 to about 8 hours at 20° C.

The undercoating composition (I) is a room-temperature-curing coating composition. It is necessary for the undercoating composition (I) to have a shrinkage stress of about 20 kg/cm$^2$ or less when it is formed into a 50 μm-thick cured coating film by being applied to a steel structure and cured at 23° C. for 30 days, in order to achieve improved adhesion to a surface of a galvanized steel substrate, and in particular a substrate surface in which the η layer of zinc in the galvanization film has been eliminated to expose the ζ layer of an iron-zinc alloy, or a substrate surface in which the η layer and ζ layer have been eliminated to expose the δ1 layer of an iron-zinc alloy, which is in contact with the steel base material. The shrinkage stress is preferably about 5 to about 18 kg/cm$^2$.

The shrinkage stress of a cured coating film of the undercoating composition is calculated, for example, as follows: after forming the cured coating film on a phosphor bronze plate whose amount of flexure beforehand is known, the amount of flexure of the plate with the coating film was measured, and the shrinkage stress is calculated based on the amounts of flexure before and after forming the coating film.

Overcoating Composition (II)

The overcoating composition (II) used in the method of the present invention comprises an epoxy resin (D) having two or more epoxy groups per molecule, a flaky pigment (E), and an amine-based curing agent (F).

The epoxy resin (D) has two or more, and preferably two to five, epoxy groups per molecule, and can be suitably selected for use from the epoxy resins listed in the above description of the epoxy resin (A).

The flaky pigment (E) preferably has an average thickness of about 0.1 to about 15 μm, an average major axis length of about 0.01 to about 2 mm, and a particle size distribution with a peak between 0.01 and 2 mm, in order to improve the anticorrosion performance. Examples of the flaky pigment (E) include mica, aluminium flakes, stainless steel flakes, glass flakes, etc. Such flaky pigments can be used singly or in combination. Among these, glass flakes can be particularly advantageously used from the viewpoint of insulation resistance.

The amount of the flaky pigment (E) is about 5 to about 100 parts by weight, and preferably about 10 to about 70 parts by weight, per 100 parts by weight of the resin (D). When the amount is less than about 5 parts by weight, the effectiveness in inhibiting the transmission of corrosive factors, such as moisture, is reduced, whereas when the amount is more than 100 parts by weight, the coating composition becomes highly viscous and the cured coating film becomes brittle, and thus such amounts are not preferable.

The amine-based curing agent (F) is a curing agent for the epoxy resin (D), and known amine-based curing agents can be used without limitation. The amine-based curing agent (F) can be suitably selected for use from the amine-based curing agents listed in the above description of the amine-based curing agent (C).

It is desirable that the proportion of the above amine-based curing agent (F) be such that the active hydrogen equivalent of the amine-based curing agent (F) is about 0.5 to about 3.0, and preferably about 0.8 to about 1.5, per equivalent of epoxy group in the epoxy resin (D), from the viewpoint of the curability and anticorrosion properties of the coating film.

The overcoating composition (II) may further contain, if necessary, pigments other than the flaky pigment (E); resins other than the epoxy resins (D), such as petroleum resins, coumarone resins, xylene resins, toluene resins, ketone resins, phenol resins, etc.; and/or additives such as thickeners, plasticizers, fillers, pigment dispersants, UV absorbers, anti-settling agents, anti-sagging agents, reactive diluents, etc.

The overcoating composition (II) is usually an organic-solvent-based coating composition, and preferably has a solids content of about 50 wt. % to about 90 wt. %. The organic solvent may be the solvent used in the production of the resin component, or an additional organic solvent may be used to adjust the solids content or for other purposes. The organic solvent can be suitably selected for use from the organic solvents listed as those usable in the undercoating composition (I).

The overcoating composition (II) is a two-component coating composition of a coating composition base comprising the components other than the amine-based curing agent (F), and a curing agent comprising the amine-based curing agent (F). The coating composition base and the curing agent are mixed together for application. The pot life after mixing is usually about 0.5 to about 6 hours at 20° C. The overcoating composition (II) is a room-temperature-curing coating composition.

Application Process

The anticorrosion coating method of the present invention comprises applying the undercoating composition (I) to a surface of a hot dip galvanized or otherwise galvanized steel structure such as a power-transmission steel tower, communication steel tower, bridge pier, guardrail, or the like, and then applying the overcoating composition (II) thereto.

The galvanized steel structure such as a power-transmission steel tower may be uncoated or may have an old coating film with obstruction marking colors or the like. The surface of such a steel structure may be a surface in which the η layer made of zinc remains; a surface in which the η layer is eliminated to expose the ζ layer made of an iron-zinc alloy; or a surface in which the η layer and ζ layer are eliminated to expose the δ1 layer. In particular, the method of the present invention is effective as an anticorrosion coating method for an exposed surface of the ζ layer made of an iron-zinc alloy, and/or an exposed surface of the δ1 layer made of an iron-zinc alloy.

In the present invention, when rust forms on the portion to be coated, suitable surface preparation, such as blasting, power tool treatment, hand-cleaning with a wire brush or the like, etc., can be carried out. When an old deteriorated coating film remains, it is preferable to remove the old coating film using surface preparation as mentioned above. When an old un-deteriorated coating remains, it is preferable to perform roughening in place of surface preparation.

The undercoating composition (I) and the overcoating composition (II) can be applied by a general coating method, such as brush coating, roller coating, spray coating, etc. The application amount of the undercoating composition is within a range such that the cured thickness is about 10 to about 200 μm, preferably about 30 to about 100 μm, and more preferably about 30 to about 80 μm; and the application amount of the overcoating composition (II) is within a range such that the cured film thickness is about 100 to about 1,500 μm, and preferably about 200 to about 800 μm. Application amounts outside the above ranges are not preferable since they may cause disadvantages such as a reduction in anticorrosion properties, a reduction in adhesion, etc.

It is usually preferable that, after application, the undercoating composition (I) be dried and cured at room temperature for about 16 hours to about 7 days, followed by application of the overcoating composition (II).

After applying the undercoating composition (I) and overcoating composition (II) to a surface of a galvanized steel structure via the above application process, a known overcoating composition, such as a urethane-resin-based overcoating composition, a fluororesins-based overcoating composition, or the like, may be further applied if necessary, in order to provide obstruction marking or to ensure compatibility with the surrounding environment.

Effects of the Invention

The anticorrosion coating method of the present invention achieves the following remarkable effects.

(1) Surfaces of galvanized steel structures, such as power-transmission steel towers or the like, can be provided with reduced shrinkage stress and improved anticorrosion properties by applying to a specific thickness an undercoating composition whose coating film has a controlled shrinkage stress, and applying thereto a flaky-pigment-containing overcoating composition to a specific thickness. Such effects can be obtained, as a matter of course, on a substrate surface in which the η layer of zinc in the galvanization film remains, and also on a substrate surface in which the η layer has been eliminated to expose the ζ layer of an iron-zinc alloy, and on a substrate surface in which the η layer and ζ layer have been eliminated to expose the δ1 layer of an iron-zinc alloy, which is in contact with the steel base material. It is thus possible to form a multilayer coating film that has excellent adhesion to the above-mentioned substrate surfaces and that can realize long-term anticorrosion properties.

(2) The method of the present invention can therefore maintain the anticorrosion performance for, for example, 50 years or more, thereby prolonging the cycle of recoating. Accordingly, anticorrosion properties of power-transmission steel towers and the like, which exist in considerable numbers, can be sufficiently maintained and controlled.

BEST MODE FOR CARRYING OUT THE INVENTION

The following Production Examples, Examples, and Comparative Examples are intended to illustrate the present invention in further detail, and not to limit the scope of the invention. In these examples, parts and percentages are by weight.

Production Example 1

Production of Undercoating Composition X (1) Production of Coating Composition Base In a 2-liter container, 150 parts of a bisphenol A-type epoxy resin solution (Note 1), 250 parts of a urethane-modified epoxy resin solution (Note 2), 5 parts of a silane coupling agent (Note 3), 330 parts of magnesium silicate, 100 parts of titanium dioxide, 20 parts of an anti-sagging agent (Note 4), 60 parts of xylene, and 85 parts of methyl isobutyl ketone were sequentially added, mixed with an agitator, and dispersed using a sand mill to a dispersion degree of 50 μm or less as measured according to JIS K5600, to obtain a base for Undercoating Composition X.

The dispersion degree was measured using a grind meter (fineness gage). The same method is used for measuring the dispersion degrees in the following Production Examples of coating composition bases.

(2) Production of Curing Agent

In a 2-liter container, 350 parts of a modified aliphatic polyamine solution (Note 5) and 650 parts of methyl isobutyl ketone were added and mixed with an agitator, to obtain a curing agent for Undercoating Composition X.

Production Example 2

Production of Undercoating Composition Y (1) Production of Coating Composition Base In a 2-liter container, 150 parts of a bisphenol A-type epoxy resin solution (Note 1), 250 parts of a petroleum resin I solution (Note 6), 5 parts of a silane coupling agent (Note 3), 330 parts of magnesium silicate, 100 parts of titanium dioxide, 20 parts of an anti-sagging agent (Note 4), 60 parts of xylene, and 85 parts of methyl isobutyl ketone were sequentially added, mixed with an agitator, and dispersed using a sand mill to a dispersion degree of 50 μm or less as measured according to JIS K5600, to obtain a base for Undercoating Composition Y.

(2) Production of Curing Agent

A curing agent for the coating composition Y was obtained in the same manner as Production Example 1 (2).

Production Example 3

Production of Undercoating Composition Z (1) Production of Coating Composition Base In a 2-liter container, 150 parts of a bisphenol A-type epoxy resin solution (Note 1), 40 parts of a petroleum resin I solution (Note 6), 5 parts of a silane coupling agent (Note 3), 195 parts of magnesium silicate, 59 parts of titanium dioxide, 20 parts of an anti-sagging agent (Note 4), 50 parts of xylene, and 80 parts of methyl isobutyl ketone were sequentially added, mixed with an agitator, and dispersed using a sand mill to a dispersion degree of 50 μm or less as measured according to JIS K5600, to obtain a base for Undercoating Composition Z.

(2) Production of Curing Agent

A curing agent for Undercoating Composition Z was obtained in the same manner as Production Example 1 (2).

Production Example 4

Production of Overcoating Composition P (1) Production of Coating Composition Base In a 2-liter container, 250 parts of a bisphenol F-type epoxy resin solution (Note 7), 35 parts of a petroleum resin II solution (Note 8), 5 parts of a silane coupling agent (Note 3), 380 parts of magnesium silicate, 180 parts of titanium dioxide, 70 parts of an anti-sagging agent (Note 4), and 80 parts of xylene were sequentially added, mixed with an agitator, and dispersed to a dispersion degree of 70 μm or less as measured according to JIS K5600. Thereafter, 100 parts of glass flakes (Note 9) was added, followed by mixing with an agitator, to obtain a base for Overcoating Composition P.

(2) Production of Curing Agent

In a 2-liter container, 800 parts of a modified polyamide polyamine solution (Note 10) and 200 parts of xylene were added and mixed with an agitator, to obtain a curing agent for Overcoating Composition P.

Production Example 5

Production of Overcoating Composition Q (1) Production of Coating Composition Base In a 2-liter container, 250 parts of a bisphenol F-type epoxy resin solution (Note 7), 35 parts of a petroleum resin II solution (Note 8), 5 parts of a silane coupling agent (Note 3), 380 parts of magnesium silicate, 180 parts of titanium dioxide, 70 parts of an anti-sagging agent (Note 4), and 80 parts of xylene were sequentially added, mixed with an agitator, and dispersed to a dispersion degree of 70 μm or less as measured according to JIS K5600, to obtain a base for Undercoating Composition Q.

(2) Production of Curing Agent

A curing agent for Undercoating Composition Q was obtained in the same manner as Production Example 4 (2).

Production Example 6

Production of Overcoating Composition R (1) Production of Coating Composition Base In a 2-liter container, 250 parts of a bisphenol F-type epoxy resin solution (Note 7), 35 parts of a petroleum resin II solution (Note 8), 5 parts of a silane coupling agent (Note 3), 180 parts of magnesium silicate, 180 parts of titanium dioxide, 70 parts of an anti-sagging agent (Note 4), and 114 parts of xylene were sequentially added, mixed with an agitator, and dispersed to a dispersion degree of 70 μm or less as measured according to JIS K5600. Thereafter, 111 parts of a stainless steel flake paste (Note 11) was added, followed by mixing with an agitator, to obtain a base for Overcoating Composition R.

(2) Production of Curing Agent

A curing agent for Overcoating Composition R was obtained in the same manner as Production Example 4 (2).

Production Example 7

Production of Overcoating Composition S (1) Production of Coating Composition Base In a 2-liter container, 250 parts of a bisphenol F-type epoxy resin solution (Note 7), 35 parts of a petroleum resin II solution (Note 8), 5 parts of a silane coupling agent (Note 3), 280 parts of magnesium silicate, 180 parts of titanium dioxide, 70 parts of an anti-sagging agent (Note 4), and 80 parts of xylene were sequentially added, mixed with an agitator, and dispersed to a dispersion degree of 70 μm or less as measured according to JIS K5600. Thereafter, 100 parts of a mica powder (Note 12) was added, followed by mixing with an agitator, to obtain a base for Overcoating Composition S.

(2) Production of Curing Agent

A curing agent for the coating composition S was obtained in the same manner as Production Example 4 (2).

In the above Production Examples, Notes 1 to 12 indicate the following.

Note 1: bisphenol A-type epoxy resin solution; tradename "Epikote 1001", a product of Yuka-Shell Epoxy Co., Ltd., a solids content of 70%; the epoxy resin has a number average molecular weight of about 900 and an epoxy equivalent weight of 475 (median)

Note 2: urethane-modified epoxy resin solution; a solids content of 40%, a reaction product of an amine-added epoxy resin with diisocyanate; the epoxy resin has a number average molecular weight of 21,000

Note 3: silane coupling agent; γ-glycidoxypropyltrimetoxysilane

Note 4: anti-sagging agent; tradename "Talen 7200-20", a product of Kyoeisha Yushi Kagaku Kogyo Co., Ltd., a solids content of 20%, an amide-wax-based thixotropic agent Note 5: modified aliphatic polyamine solution; a solids content of 40%, a reaction product of the epoxy resin of Note 1 with diethylenetriamine, an active hydrogen equivalent of 145

Note 6: petroleum resin I solution; tradename "Neopolymer 120", a product of Nippon Petrochemicals Co., Ltd., an aromatic petroleum resin (C8-C10 aromatic hydrocarbon fraction polymer) having a softening point of 120° C., a solids content of 40%

Note 7: bisphenol F-type epoxy resin solution; a solids content of 100%; the epoxy resin has a number average molecular weight of 400 and an epoxy equivalent weight of 190 (median)

Note 8: petroleum resin II solution; a phenol-modified petroleum resin having a softening point of −5° C., a solids content of 97%

Note 9: glass flakes; an average thickness of 5 μm, an average major axis length of 0.2 mm, a particle size distribution (45 to 300 μl) of 70% or more, a particle size distribution peak at 0.15 mm Note 10: modified polyamide polyamine solution; a solids content of 80%, an active hydrogen equivalent of 115

Note 11: stainless steel flake paste; an average stainless steel flake thickness of 5 μm, an average stainless steel flake major axis length of 0.08 mm, a solids content of 90%, a particle size distribution (125 μm or less) of 99%, and a particle size distribution peak at 0.08 mm Note 12: mica powder; an average thickness of 1.8 μm, an average major axis length of 0.1 mm, a particle size distribution (45 to 150 μm) of 98%, and a particle size distribution peak at 0.12 mm Production Example 8

Production of Test Plate

A commercially available hot dip galvanized steel plate (3.2 mm×70 mm×150 mm) was weathered in a seaside area to deplete it until the ζ layer of an iron-zinc alloy was exposed on the surface. The surface of the resulting steel plate was then polished with sandpaper (#240) to obtain Test Plate (i).

Separately, a hot dip galvanized steel plate as mentioned above was grit-blasted to achieve a surface preparation grade of ISO Sa1.0, to obtain Test Plate (ii). The surface of Test Plate (ii) was determined as the η layer.

Examples 1 to 5 and Comparative Examples 1 to 6

The undercoating compositions and overcoating compositions obtained in Production Examples 1 to 7, in combination shown in Tables 1 and 2, were applied to Test Plates (i) and (ii) obtained in Production Example 8. Comparative Example 5 is a simple anticorrosion coating method conventionally employed for coating power-transmission steel towers.

Each of the undercoating compositions and overcoating compositions was diluted with 5 parts of a thinner (xylene/methyl ethyl ketone=80/20) per 100 parts of the composition, and applied by brush coating to a predetermined cured thickness. The interval between the application of the undercoating composition and that of the overcoating composition was 24 hours. After applying the overcoating composition, the resulting coating was dried and cured at 23° C. for 30 days to form an anticorrosion multilayer coating film. Tables 1 and 2 show the cured thickness of the coating films obtained in the Examples and Comparative Examples.

TABLE 1

| Example | 1 | 2 | 3 | 4 | 5 |
|---|---|---|---|---|---|
| Type of Test Plate | (i) | (i) | (i) | (i) | (ii) |
| Type of Coating Composition for First Layer | Undercoating Comp. X | Undercoating Comp. X | Undercoating Comp. X | Undercoating Comp. Y | Undercoating Comp. X |
| (Cured Thickness, μm) | (50) | (50) | (50) | (50) | (50) |
| Type of Coating Composition for Second Layer | Overcoating Comp. P | Overcoating Comp. R | Overcoating Comp. S | Overcoating Comp. P | Overcoating Comp. P |
| (Cured Thickness, μm) | (450) | (450) | (450) | (450) | (450) |

TABLE 2

| Comparative Example | 1 | 2 | 3 | 4 | 5 | 6 |
|---|---|---|---|---|---|---|
| Type of Test Plate | (i) | (i) | (i) | (i) | (i) | (ii) |
| Type of Coating Composition for First Layer | Undercoating Comp. X | Undercoating Comp. Z | Undercoating Comp. X | Undercoating Comp. Y | Undercoating Comp. Z | Undercoating Comp. Z |
| (Cured Thickness, μm) | (50) | (50) | (50) | (50) | (50) | (50) |
| Type of Coating Composition for Second Layer | Overcoating Comp. Q | Overcoating Comp. P | Undercoating Comp. X | Undercoating Comp. Y | Polyurethane Resin Coating Comp. | Overcoating Comp. P |
| (Cured Thickness, μm) | (450) | (450) | (50) | (50) | (35) | (450) |

In the coating compositions shown in Tables 1 and 2, the coating composition base/curing agent ratios and the solids contents are as follows.
Undercoating composition X: coating composition base/curing agent=90/10, a solids content of 72%
Undercoating composition Y: coating composition base/curing agent=90/10, a solids content of 72%
Undercoating composition Z: coating composition base/curing agent=80/20, a solids content of 54%
Overcoating composition P: coating composition base/curing agent=5/1, a solids content of 85%
Overcoating composition Q: coating composition base/curing agent=5/1, a solids content of 77%
Overcoating composition R: coating composition base/curing agent=5/1, a solids content of 85%
Overcoating composition S: coating composition base/curing agent=5/1, a solids content of 85%
Polyurethane resin coating composition: coating composition base/curing agent=85/15, a solids content of 60%, tradename "Retan 6000", a product of Kansai Paint Co., Ltd.

The shrinkage stress of each undercoating composition was calculated by the following method. The undercoating composition was applied to a cured thickness of 50 μm to a 100 μm-thick phosphor bronze plate measuring 10 mm×120 mm, whose initial amount of flexure was known. After drying and curing at 25° C. for 30 days, the amount of flexure of the resulting phosphor bronze plate was measured, and the shrinkage stress was calculated based on the measurement. The shrinkage stress of each undercoating composition is as follows.

Undercoating composition X: 10 kg/cm$^2$; Undercoating composition Y: 18 kg/cm$^2$; Undercoating composition Z: 30 kg/cm$^2$ The plates coated with the anticorrosion coating films in Examples 1 to 5 and Comparative Examples 1 to 6 were subjected to a thermal cycle test, a humidity resistance test, and a neutral salt spray resistance test. The test methods are as follows.

Thermal cycle test: A thermal cycle test of 500 cycles each consisting of "at −30° C. for 3 hours; being allowed to cool for 3 hours; at 70° C. and a relative humidity of 90% for 3 hours; and being allowed to cool for 3 hours" was performed, and the anticorrosion properties were evaluated according to the following criteria.

A: No cracking, blistering, or rusting was caused in the coating film; B: Cracking, blistering, or rusting was caused in the coating film by 500 to 400 cycles; C: Cracking, blistering, or rusting was caused in the coating film by 400 to 300 cycles; D: Cracking, blistering, or rusting was caused in the coating film by 300 to 200 cycles; E: Cracking, blistering, or rusting was caused in the coating film by 200 cycles or less.

Humidity resistance test: The humidity resistance test (continuous condensation method) defined in JIS K5600-7-2 was carried out for 1,200 hours, and further an immersion test in 60° C. hot water was performed for 1,000 hours. The coating film was then examined for blistering to evaluate the anticorrosion properties according to the following criteria.

A: No blistering in the coating film after the humidity resistance test and hot water immersion test; B: No blistering in the coating film until after 1200 hours of the humidity resistance test, and blistering occurred in the subsequent hot water immersion test; C: No blistering in the coating film until after 900 hours of the humidity resistance test, and blistering occurred in 900 to 1,200 hours of the humidity resistance test; D: No blistering in the coating film until after 600 hours of the humidity resistance test, and blistering occurred in 600 to 900 hours of the humidity resistance test; E: Blistering occurred in the coating film in 300 hours or less of the humidity resistance test.

Neutral salt spray resistance test: The test was carried out for 2,000 hours according to the neutral salt spray resistance test defined in JIS K5600-7-1, and the width of defects, which were blistering or red rusting in the coating film, was measured to evaluate the anticorrosion properties according to the following criteria.

A: The defect width was less than 5 mm; B: The defect width was not less than 5 mm and less than 10 mm; C: The defect width was not less than 10 mm and less than 15 mm; D: The defect width was not less than 15 mm and less than 20 mm; E: The defect width was not less than 20 mm.

Table 3 shows the test results. In each test, coating films evaluated as B or better are practically usable as anticorrosion coating films for hot dip galvanized steel structures.

TABLE 3

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Thermal Cycle Test | A | A | B | B | B | C | E | E | E | E | E |
| Humidity Resistance Test | A | B | B | B | A | C | C | E | D | E | D |
| Neutral Salt Spray Resistance Test | A | A | B | A | A | C | C | D | D | E | E |

The invention claimed is:

1. An anticorrosion coating method for a galvanized steel structure, the method comprising applying an undercoating composition (I) to a cured thickness of 10 to 200 μm to a surface of a galvanized steel structure, and then applying thereto an overcoating composition (II) to a cured thickness of 100 to 1,500 μM;

the undercoating composition (I) comprising an epoxy resin (A) having two or more epoxy groups per molecule; at least one resin (B) selected from the group consisting of urethane-modified epoxy resins obtained by reacting polyisocyanate compounds with amine-added epoxy resins, and petroleum resins; and an amine-based curing agent (C); the amount of the resin (B) being 10 to 300 parts by weight per 100 parts by weight of solids of the resin (A); the undercoating composition (I) having a shrinkage stress of 20 kg/cm$^2$ or less when it is in the form of a 50 μm-thick coating film cured at 23° C. for 30 days after application;

the overcoating composition (II) comprising an epoxy resin (D) having two or more epoxy groups per molecule, a glass flake (E), and an amine-based curing agent (F); and the amount of the glass flake (E) being 5 to 100 parts by weight per 100 parts by weight of solids of the resin (D)

wherein the epoxy resin (A) is obtained by reacting at least one polyhydric phenol selected from the group consisting of bisphenol A and bisphenol F with epichlorohydrins, and the epoxy resin (D) is obtained by reacting at least one polyhydric phenol selected from the group consisting of bisphenol A and bisphenol F with epichlorohydrins.

2. An anticorrosion coating method according to claim 1, wherein the resin (B) in the undercoating composition (I) is a urethane-modified epoxy resin obtained by reacting polyisocyanate compounds with amine-added epoxy resins.

3. An anticorrosion coating method according to claim 1, wherein the resin (B) in the undercoating composition (I) is a petroleum resin; the resin (B) being solid at room temperature and having a melting point of 60° C. or higher.

4. An anticorrosion coating method according to claim 1, wherein the proportion of the amine-based curing agent (C) in the undercoating composition (I) is such that the active hydrogen equivalent of the amine-based curing agent (C) is 0.5 to 3.0 per equivalent of epoxy group in the epoxy resin (A).

5. An anticorrosion coating method according to claim 1, wherein the proportion of the amine-based curing agent (F) in the overcoating composition (II) is such that the active hydrogen equivalent of the amine-based curing agent (F) is 0.5 to 3.0 per equivalent of epoxy group in the epoxy resin (D).

6. An anticorrosion coating-method according to claim 1, wherein the surface of the galvanized steel structure is an exposed surface of a ζ layer made of an iron-zinc alloy and/or an exposed surface of a δ1 layer made of an iron-zinc alloy.

* * * * *